(12) United States Patent
Kanneath Abraham

(10) Patent No.: US 12,363,572 B2
(45) Date of Patent: Jul. 15, 2025

(54) METHOD FOR PROVIDING SELF-OPTIMISATION DATA

(71) Applicant: NOKIA TECHNOLOGIES OY, Espoo (FI)

(72) Inventor: Aby Kanneath Abraham, Kerala (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 383 days.

(21) Appl. No.: 17/756,360

(22) PCT Filed: Oct. 28, 2020

(86) PCT No.: PCT/EP2020/080253
§ 371 (c)(1),
(2) Date: May 23, 2022

(87) PCT Pub. No.: WO2021/104784
PCT Pub. Date: Jun. 3, 2021

(65) Prior Publication Data
US 2022/0394530 A1 Dec. 8, 2022

(30) Foreign Application Priority Data
Nov. 28, 2019 (IN) .............................. 201941048800

(51) Int. Cl.
*H04W 24/10* (2009.01)
*H04W 88/06* (2009.01)

(52) U.S. Cl.
CPC ............ *H04W 24/10* (2013.01); *H04W 88/06* (2013.01)

(58) Field of Classification Search
None
See application file for complete search history.

(56) References Cited

U.S. PATENT DOCUMENTS

| 10,212,615 | B1* | 2/2019 | Jha | ........................ | H04W 24/02 |
| 2011/0287759 | A1* | 11/2011 | Jung | ................. | H04W 52/0206 |
| | | | | | 455/422.1 |
| 2015/0296520 | A1* | 10/2015 | Batchu | .................. | H04W 48/16 |
| | | | | | 455/434 |
| 2018/0070327 | A1* | 3/2018 | Qureshi | ............ | H04W 56/0055 |
| 2018/0160422 | A1* | 6/2018 | Pathak | .................. | H04W 76/10 |
| 2021/0204147 | A1* | 7/2021 | Axmon | ................. | H04W 24/10 |

OTHER PUBLICATIONS

International Search Report and Written Opinion for International Application No. PCT/EP2020/080253, mailed on Feb. 22, 2021, 15 pages.

* cited by examiner

*Primary Examiner* — Adnan Baig
(74) *Attorney, Agent, or Firm* — Lippes Mathias LLP (57) ABSTRACT

An apparatus comprising at least a first subscriber identity module (SIM) associated with a first network, at least one processor and at least one memory, said at least one memory stored with computer pro-associated gram code thereon, the at least one memory and the computer program code configured to, with the at least one processor, cause the apparatus at least to perform: detect that the first SIM experiences a radio link failure (RLF) or has moved to out-of-service (OOS) state due to an internal action of said apparatus; include in a report to be sent to the first network information about the detection of the RLF or the OOS state of the first SIM; and include in the report an indication that the detection of the RLF or the OOS state of the first SIM is due to the internal action of said apparatus.

4 Claims, 7 Drawing Sheets

METHOD FOR PROVIDING SELF-OPTIMISATION DATA

CROSS-REFERENCE TO RELATED APPLICATIONS

This application is a national stage entry of International Application No. PCT/EP2020/080253, filed Oct. 28, 2020, entitled "A METHOD FOR PROVIDING SELF-OPTIMISATION DATA" which claims the benefit of priority of Indian Application No. 201941048800, filed Nov. 28, 2019, both of which are hereby incorporated by reference in their entireties.

TECHNICAL FIELD

The present invention relates to providing self-optimisation data to network from a user equipment.

BACKGROUND

Wireless devices with multiple subscriber identification module (SIM) cards (so-called multi-SIM wireless device) have become increasing popular due to their ability to allow a user to use multiple service providers on the same device. Thus, the user may e.g. distinguish his/her business account and personal account on separate numbers and invoices and/or take advantage of different pricing schemes of the operators.

One type of multi-SIM wireless device, referred to as a dual-SIM dual active (DSDA) device, comprises two different transmission/reception (TX/RX) functionalities, i.e. one for each SIM, thereby allowing simultaneous active connections with the two networks corresponding to said SIMs. However, separate TX/RX functionalities are expensive to implement and may require high power consumption during operation. Therefore, another type of multi-SIM wireless device, referred to as a dual-SIM dual standby (DSDS) device, is more prevalent on the market. A DSDS device comprises a single TX/RX functionality, which is shared by the SIMs. Therein, both SIMs, or more precisely the network subscriptions associated with the SIMs, may operate in idle mode (also referred as the standby mode), wherein both SIMs may receive pages using the shared RF resource and either of the SIMs may originate or terminate a communication (e.g., a voice call or data call), whereupon said SIM changes to operate in connected mode.

Thus, in a DSDS device, when the first SIM is having an ongoing call via a first network, the second SIM of a second network has no RF resources available, and therefore it is not active. Consequently, the second SIM will either experience a radio link failure (RLF), if the second SIM was still in connected mode due to previous communication, or it will move to out-of-service (OOS) state, if it was in idle mode.

The DSDS device repeatedly reports various data and measurements to the network operators of the first SIM and the second SIM for enabling them to improve and optimise the operation of their networks. The reported data about RLF and OOS may be utilised by the network for making several planning decisions and optimizing various parameters like the parameters related to mobility in both connected and idle mode. For example, if the number of radio link failures are more than a specified threshold, the network may decide to reduce the threshold at which devices are moved to new cell. Similarly, if the OOSs are quite frequent, network operator may plan to install new base stations in such location.

However, such data relating to the above-described RLF or OOS state of the second SIM do not reflect any actual malfunction of the second network, but it is only due to normal DSDS device operation. Nevertheless, when provided to the operator of the second network, such data will lead to false conclusions about the operation of the second network.

Such false conclusions about the operation of the network are not limited to multi-SIM devices only, but they may also occur due to internal processes of single-SIM-devices. A single-SIM device may shut down the RF circuit due to its own internal processes, such as high temperature protection for preventing overheating or as a part of power saving mechanism when the battery charge level is low. When the RF circuit is shutdown, it may lead to RLF or OOS depending on whether device was in connected or idle. However, when reported to the network operator, false conclusions about the operation of the second network, as described above, may be made.

SUMMARY

Now, an improved method and technical equipment implementing the method has been invented, by which the above problems are alleviated. Various aspects include a method, an apparatus and a non-transitory computer readable medium comprising a computer program, or a signal stored therein, which are characterized by what is stated in the independent claims. Various details of the embodiments are disclosed in the dependent claims and in the corresponding images and description.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is provided an apparatus comprising at least a first subscriber identity module (SIM) associated with a first network, at least one processor and at least one memory, said at least one memory stored with computer program code thereon, the at least one memory and the computer program code configured to, with the at least one processor, cause the apparatus at least to perform: detect that the first SIM experiences a radio link failure (RLF) or has moved to out-of-service (OOS) state due to an internal action of said apparatus; include in a report to be sent to the first network information about the detection of the RLF or the OOS state of the first SIM; and include in the report an indication that the detection of the RLF or the OOS state of the first SIM is due to the internal action of said apparatus.

According to an embodiment, said report is a minimisation of test drive (MDT) report.

According to an embodiment, the apparatus further comprises a second SIM associated with a second network.

According to an embodiment, said internal action of the apparatus is a reservation of a radio transceiver of the apparatus for a communication of the second SIM with the second network.

According to an embodiment, said internal action of the apparatus is a shutdown of a radio transceiver of the apparatus.

According to an embodiment, said indication is a flag indicating whether the detection of the RLF or the OOS state of the first SIM relates to the first network.

A method according to a second aspect comprises detecting, in an apparatus comprising at least a first subscriber identity module (SIM) associated with a first network, that the first SIM experiences a radio link failure (RLF) or has moved to out-of-service (OOS) state due to an internal action of said apparatus; including in a report to be sent to the first network information about the detection of the RLF or the OOS state of the first SIM; and including in the report an indication that the detection of the RLF or the OOS state of the first SIM is due to the internal action of said apparatus.

An apparatus according to a third aspect comprises at least one processor and at least one memory, said at least one memory stored with computer program code thereon, the at least one memory and the computer program code configured to, with the at least one processor, cause the apparatus at least to perform: receive information, from a second apparatus comprising at least a first subscriber identity module (SIM) associated with a first network, that the first SIM has experienced a radio link failure (RLF) or has been moved to out-of-service (OOS) state; obtain from said information an indication that detection of the RLF or the OOS state of the first SIM is due to the internal action of said second apparatus; and update information about the first network based on at least the received indication.

A method according to a fourth aspect comprises receiving information, from a second apparatus comprising at least a first subscriber identity module (SIM) associated with a first network, that the first SIM has experienced a radio link failure (RLF) or has been moved to out-of-service (OOS) state; obtaining from said information an indication that detection of the RLF or the OOS state of the first SIM is due to the internal action of said second apparatus; and updating information about the first network based on at least the received indication.

Computer readable storage media according to further aspects comprise code for use by an apparatus, which when executed by a processor, causes the apparatus to perform the above methods.

BRIEF DESCRIPTION OF THE DRAWINGS

For a more complete understanding of the example embodiments, reference is now made to the following descriptions taken in connection with the accompanying drawings in which.

DETAILED DESCRIPTION OF SOME EXAMPLE EMBODIMENTS

The following describes in further detail suitable apparatus and possible mechanisms for providing more reliable self-optimisation data from a user equipment to a network. While the following focuses on DSDS devices in LTE and 5G networks, the embodiments as described further below are by no means limited to be implemented in said networks only, but they are applicable in any network supporting any type of collecting and analysing various information from the UEs for self-optimisation and self-organisation of the network.

Figure 1:
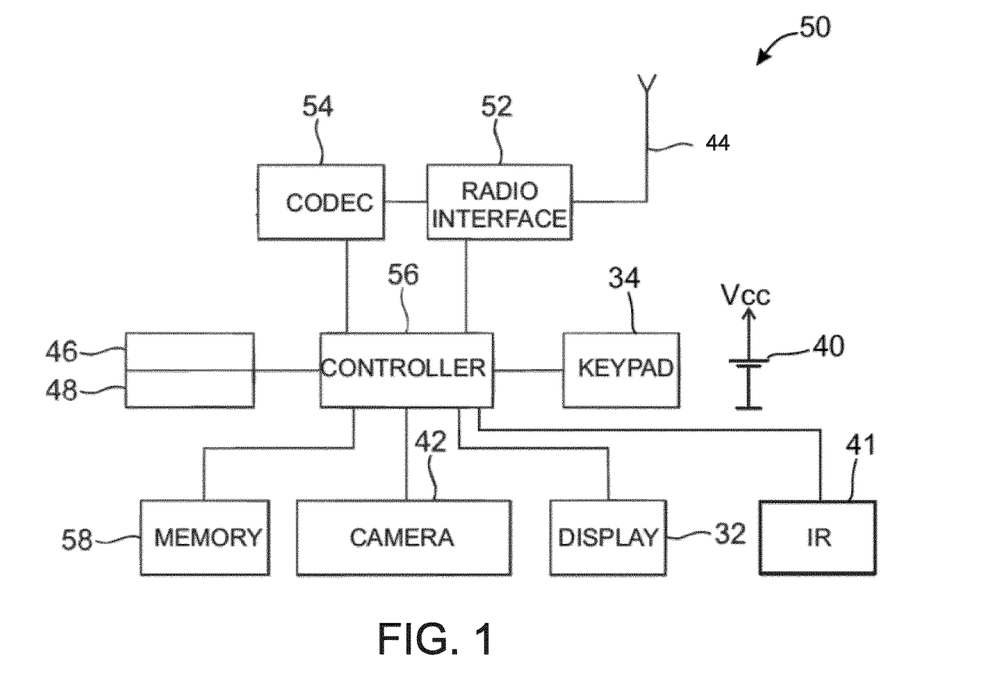
FIG. 1 shows a schematic block diagram of an apparatus for incorporating a dual-SIM arrangement according to the embodiments.
Figure 2:
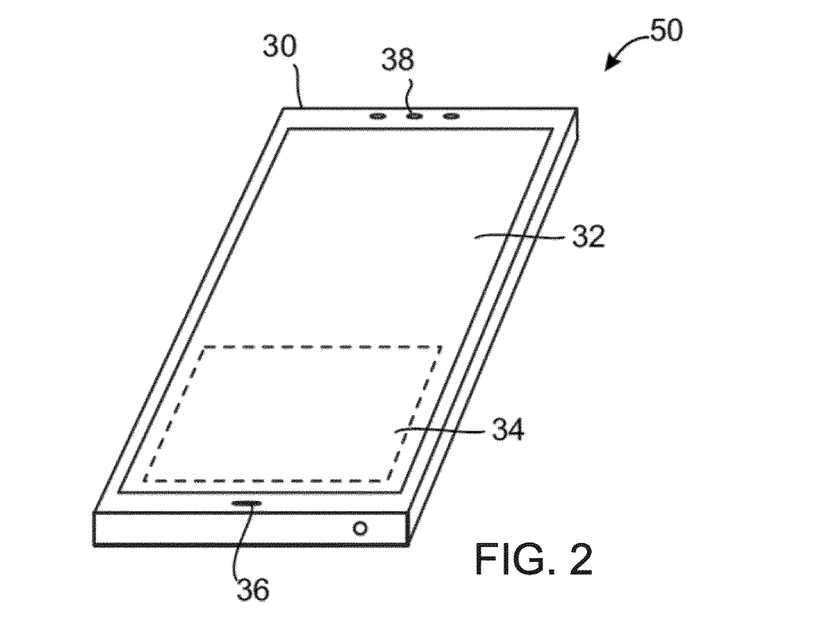
FIG. 2 shows schematically a layout of an apparatus according to an example embodiment.

In this regard, reference is first made to FIGS. 1 and 2, where FIG. 1 shows a schematic block diagram of an exemplary apparatus or electronic device 50, which may incorporate the dual-SIM arrangement according to the embodiments. FIG. 2 shows a layout of an apparatus according to an example embodiment. The elements of FIGS. 1 and 2 will be explained next.

The electronic device 50 may for example be a mobile terminal or user equipment of a wireless communication system. The apparatus 50 may comprise a housing 30 for incorporating and protecting the device. The apparatus 50 further may comprise a display 32 and a keypad 34. Instead of the keypad, the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device, such as anyone of: an earpiece 38, speaker, or an analogue audio or digital audio output connection. The apparatus 50 may also comprise a battery 40 (or the device may be powered by any suitable mobile energy device such as solar cell, fuel cell or clockwork generator). The apparatus may further comprise a camera 42 capable of recording or capturing images and/or video. The apparatus 50 may further comprise an infrared port 41 for short range line of sight communication to other devices. In other embodiments the apparatus 50 may further comprise any suitable short-range communication solution such as for example a Bluetooth wireless connection or a USB/firewire wired connection.

The apparatus 50 may comprise a controller 56 or processor for controlling the apparatus 50. The controller 56 may be connected to memory 58 which may store both user data and instructions for implementation on the controller 56. The memory may be random access memory (RAM) and/or read only memory (ROM). The memory may store computer-readable, computer-executable software including instructions that, when executed, cause the controller/processor to perform various functions described herein. In some cases, the software may not be directly executable by the processor but may cause a computer (e.g., when compiled and executed) to perform functions described herein. The controller 56 may further be connected to codec circuitry 54 suitable for carrying out coding and decoding of audio and/or video data or assisting in coding and decoding carried out by the controller.

For implementing the dual-SIM dual standby (DSDS) functionality, the apparatus 50 may further comprise a first card reader 46 and a second card reader 48, which may be supplied with a first subscriber identity module (SIM) associated with a first network and a second SIM associated with a second network, respectively, for providing user information and being suitable for providing authentication information for authentication and authorization of the user at the first network and the second network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In an apparatus operating according to DSDS principle, the first card reader 46 and the second card reader 48, and consequently the first SIM associated with the first network and the second SIM associated with the second network, are configured to use the radio interface circuitry 52 and the antenna 44 in alternating manner: while both SIMs may be capable of receiving page messages from their associated networks, only either of the SIMs may originate or terminate a communication (e.g., a voice call or data call).

In the following, different exemplifying embodiments will be described using, as an example of an access architecture to which the embodiments may be applied, a radio access architecture based on Long Term Evolution Advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

Figure 3:
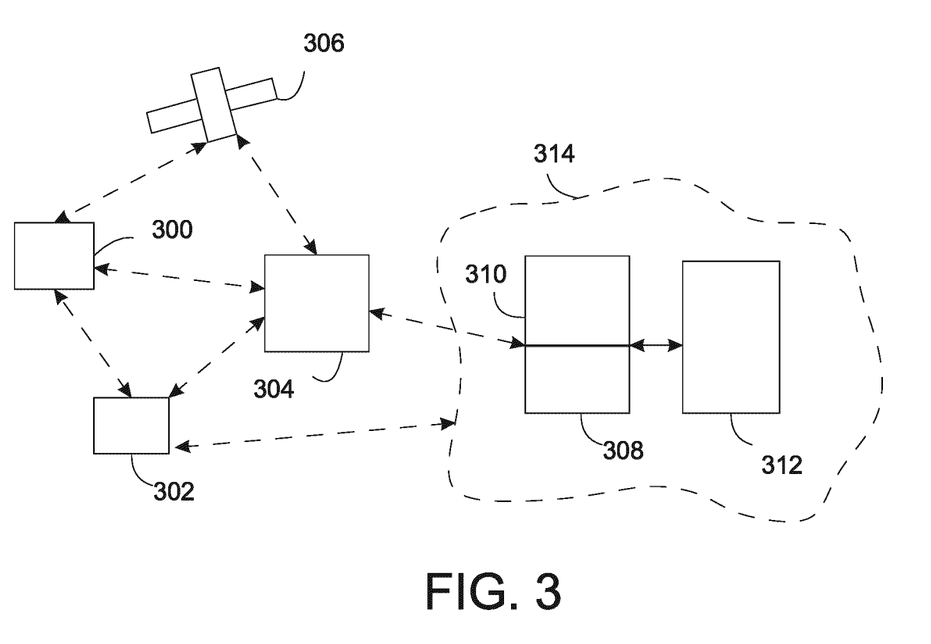
FIG. 3 shows a part of an exemplifying radio access network.

FIG. 3 depicts examples of simplified system architectures only showing some elements and functional entities, all being logical units, whose implementation may differ from what is shown. The connections shown in FIG. 3 are logical connections; the actual physical connections may be different. It is apparent to a person skilled in the art that the system typically comprises also other functions and structures than those shown in FIG. 3. The embodiments are not, however, restricted to the system given as an example but a person skilled in the art may apply the solution to other communication systems provided with necessary properties.

The example of FIG. 3 shows a part of an exemplifying radio access network.

FIG. 3 shows user devices 300 and 302 configured to be in a wireless connection on one or more communication channels in a cell with an access node (such as (e/g)NodeB) 304 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 310 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. The CN may comprise network entities or nodes that may be referred to management entities. Examples of the network entities comprise at least an Access management Function (AMF).

The user device (also called a user equipment (UE), a user terminal, a terminal device, a wireless device, a mobile station (MS) etc.) illustrates one type of an apparatus to which resources on the air interface are allocated and assigned, and thus any feature described herein with a user device may be implemented with a corresponding network apparatus, such as a relay node, an eNB, and an gNB. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. Accordingly, the user device may be an IoT-device. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 312, or utilize services provided by them. The communication network may also be able to support the usage of cloud services, for example at least part of core network operations may be carried out as a cloud service (this is depicted in FIG. 3 by "cloud" 314). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU) and non-real time functions being carried out in a centralized manner (in a centralized unit, CU 308).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize non-terrestrial nodes 306, e.g. access nodes, to enhance or complement the coverage of 5G service, for example by providing backhauling, wireless access to wireless devices, service continuity for machine-to-machine (M2M) communication, service continuity for Internet of Things (IoT) devices, service continuity for passengers on board of vehicles, ensuring service availability for critical communications and/or ensuring service availability for future railway/maritime/aeronautical communications. The non-terrestrial nodes may have fixed positions with respect to the Earth surface or the non-terrestrial nodes may be mobile non-terrestrial nodes that may move with respect to the Earth surface. The non-terrestrial nodes may comprise satellites and/or HAPSs. Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node 304 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

The Radio Resource Control (RRC) protocol is used in various wireless communication systems for defining the air interface between the UE and a base station, such as eNB/gNB. This protocol is specified by 3GPP in in TS 36.331 for LTE and in TS 38.331 for 5G. In terms of the RRC, the UE may operate in LTE and in 5G in an idle mode or in a connected mode, wherein the radio resources available for the UE are dependent on the mode where the UE at present resides. In 5G, the UE may also operate in inactive mode. In the RRC idle mode, the UE has no connection for communication, but the UE is able to listen to page messages. In the RRC connected mode, the UE may operate in different states, such as CELL DCH (Dedicated Channel), CELL FACH (Forward Access Channel), CELL PCH (Cell Paging Channel) and URA PCH (URA Paging Channel). The UE may communicate with the eNB/gNB via various logical channels like Broadcast Control Channel (BCCH), Paging Control Channel (PCCH), Common Control Channel (CCCH), Dedicated Control Channel (DCCH), Dedicated Traffic Channel (DTCH).

The transitions between the states is controlled by a state machine of the RRC. When the UE is powered up, it is in a disconnected mode/idle mode. The UE may transit to RRC connected mode with an initial attach or with a connection establishment. If there is no activity from the UE for a short time, eNB/gNB may suspend its session by moving to RRC Inactive and can resume its session by moving to RRC connected mode. The UE can move to the RRC idle mode from the RRC connected mode or from the RRC inactive mode.

Network operators usually collect and analyse various information from the devices for self-optimisation and self-organisation. Wireless standards like LTE RRC specification 36.331 and 5G RRC specification 38.331 specify various data and measurements that the networks will collect for SON (Self Optimising Networks). A major use case of SON is minimisation of drive tests (MDT).

Previously, a significant part of network performance measurements has been carried out using a drive test driven by a vehicle in the coverage area of the network, wherein the vehicle is provided a test equipment for carrying out various network performance measurements at different locations. MDT is a concept aiming to at least minimize, or possibly to avoid completely, the need for drive tests.

In brief, MDT comprises periodic reporting of location of the UE via a satellite positioning system, such as GPS, provided that the GPS receiver of the UE is enabled, and the UE supports GPS reporting over Layer 3 (RRC Measurement Report). Both the UE and the associated NB/eNB carry out legacy/ordinary L3 and L2 measurements typically used for signaling and radio resource management. These measurements from both the UE and the associated NB/eNB are reported periodically as SON data to a unit collecting the MDT data, which may also be referred to as an MDT Data collector, for processing and analysis. Thus, the data can be collected by a centralized system (MDT Data Collector) and processed to be available in a short time after collection.

However, if the SON data is provided by a DSDS device, the DSDS operating principle may cause somewhat corrupted SON data to be provided to the MDT Data collector. For example, when the first SIM of the DSDS device is having an ongoing call via a first network, the second SIM associated with a second network has no RF resources available, and therefore it is not active. Consequently, the second SIM will either experience a radio link failure (RLF), if the second SIM was still in connected mode due to previous communication, or it will move to out-of-service (OOS) state, if it was in idle mode.

As a result, the SON data gathered relating to the above-described RLF or OOS state of the second SIM do not reflect any actual malfunction of the second network, but it only due to normal DSDS device operation. Nevertheless, when provided to the operator of the second network, such data will lead to false conclusions about the operation of the second network. Similar behaviour may be observed in dual-SIM dual active (DSDA) devices or even single SIM device when RLF or OOS occurs due to certain internal actions leading to RF shutdown based on high temperature, power saving optimisations etc.

In the following, an enhanced method for gathering more reliable SON data will be described in more detail, in accordance with various embodiments.

Figure 4:
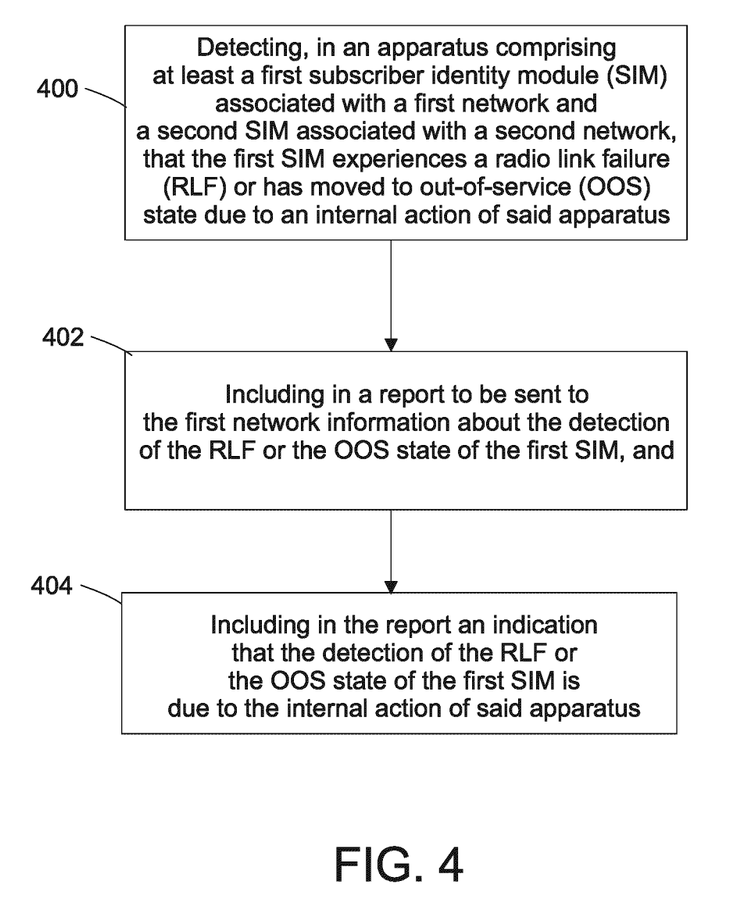
FIG. 4 shows a flow chart for providing self-optimisation data according to an embodiment.

The method, which is disclosed in FIG. 4, comprises detecting (400), in an apparatus comprising at least a first subscriber identity module (SIM) associated with a first network, that the first SIM experiences a radio link failure (RLF) or has moved to out-of-service (OOS) state due to an internal action of said apparatus; including (402) in a report to be sent to the first network information about the detection of the RLF or the OOS state of the first SIM; and including (404) in the report an indication that the detection of the RLF or the OOS state of the first SIM is due to the internal action of said apparatus.

Thus, the method enables to provide a network element, such as the MDT Data collector, with, besides the SON data as defined by the standards, but also an indication that the detection of the RLF or the OOS state of the SIM is due to the internal action of said apparatus. Such data may be provided by both DSDS devices and single SIM devices. Thus, upon processing and analysing the SON data, said indication about an occurrence of the RLF or the OOS state of the SIM being due to an internal action of the apparatus may cause the MDT Data collector to neglect, or at least selectively take into account, the SON data. Thereby, more reliable data about performance of the network may be obtained and the optimisation of various network parameters, such as mobility thresholds, offsets and filter coefficients, may be performed based on less erroneous data.

In the following, various embodiments will be described using examples relating to LTE and 5G networks. It is, however, noted that the method and the embodiments are applicable in any network implementing any type of collecting and analysing various information from the UEs for self-optimisation and self-organisation of the network. It is further noted that while the discussion herein refers to a SIM operating in a certain mode (such as idle, connected or inactive), this actually refers to the network subscription associated with the SIM operating in said mode.

According to an embodiment, said report is a minimisation of test drive (MDT) report. Many wireless standards specify a plurality of MDT reports for the UEs to measure, both in idle/inactive mode and in connected mode. The UE then creates a log about results of the specified measurements, which is reported via the base station, such as the gNB, to the MDT Data collector.

An example of an MDT report is a mobility history information of the UE. The UE creates a log, in UE history information, about the cells it has visited along with the duration of stay in each cell, as well as the time it has spent outside any network.

For example, LTE RRC specification 36.331 defines the operation for the UE, if supporting storage of mobility history information, upon change of cell, consisting of PCell in RRC_CONNECTED or serving cell in RRC_IDLE, to another EUTRA or inter-RAT cell or when entering out of service, to include an entry in variable VarMobilityHistoryReport possibly after removing the oldest entry, if necessary. The entries should include the global cell identity of that cell in the field visitedCellId of the entry, if the global cell identity of the previous PCell/serving cell is available, or the physical cell identity and carrier frequency of that cell in the field visitedCellId of the entry. The field timeSpent of the entry is set as the time spent in the previous PCell/serving cell. Upon entering E-UTRA (in RRC_CONNECTED or RRC_IDLE) while theUE has previously been out-of-service (OOS) and/or using another RAT, an entry should be included in variable VarMobilityHistoryReport possibly after removing the oldest entry, if necessary, wherein the field timeSpent of the entry is set as the time spent outside E-UTRA.

An example of an MDT report is an RLF information report. The UE stores the information related to radio link failure, basically the measurements at the time of RLF and the location of the failure when available, and reports the information to network based on the request.

Now, upon the operation of the apparatus due to a detected internal action as described above, either or both of these MDT reports may be provided an indication that the detection of the RLF or the OOS state of the SIM is due to the internal action of said apparatus.

According to an embodiment, the apparatus further comprises a second SIM associated with a second network. Thus, while some of the embodiments and the associated advantages are applicable both in single SIM devices and DSDS devices, some other embodiments are more prominent in DSDS devices.

According to an embodiment, said internal action of the apparatus is a reservation of a radio transceiver of the apparatus for a communication of the second SIM with the second network. In a typical DSDS apparatus, there is only single TX/RX functionality, which is shared by the SIMs. Thus, the radio transceiver of the apparatus may be reserved for only either of the SIMs for originating or terminating a communication (e.g., a voice call or data call), whereupon the other SIM is not active and either experiences a radio link failure (RLF), if it was in connected mode, or it will move to out-of-service (OOS) state, if it was in idle mode.

According to an embodiment, said internal action of the apparatus is a shutdown of a radio transceiver of the apparatus. The internal action causing the detection of the RLF or the OOS state may not necessarily relate to either of the SIMs reserving the radio transceiver of the apparatus for communication, but the apparatus may shut down the RF circuit e.g. due to high operating temperature or as a part of power saving mechanism when the battery level is low. This may result in detection of the RLF or the OOS state, whereupon the indication as described above may be sent via the base station, such as the gNB, to the MDT Data collector. It is noted that this embodiment is equally applicable for single SIM devices.

According to an embodiment, said indication is a flag indicating whether the detection of the RLF or the OOS state of the first SIM relates to the first network. Thus, the indication whether the detection of the RLF or the OOS state of the first SIM relates to the first network or to an internal operation of the apparatus may be implemented simply by including a flag, i.e. one bit, in or along the MDT report. The bit may be allocated a value 1, if the detection of the RLF or the OOS state of the first SIM relates to the first network, and a value 0, if the detection of the RLF or the OOS state of the first SIM relates to an internal operation of the apparatus, or vice versa. Thus, the overhead caused by the important indication is kept as low as possible.

Alternatively, a bit included in or along the MDT report may indicate that the detection of the RLF or the OOS state of the first SIM relates to an internal operation of the apparatus, whereas the absence of the bit may indicate that the detection of the RLF or the OOS state of the first SIM relates to the first network, or vice versa.

Figure 5:
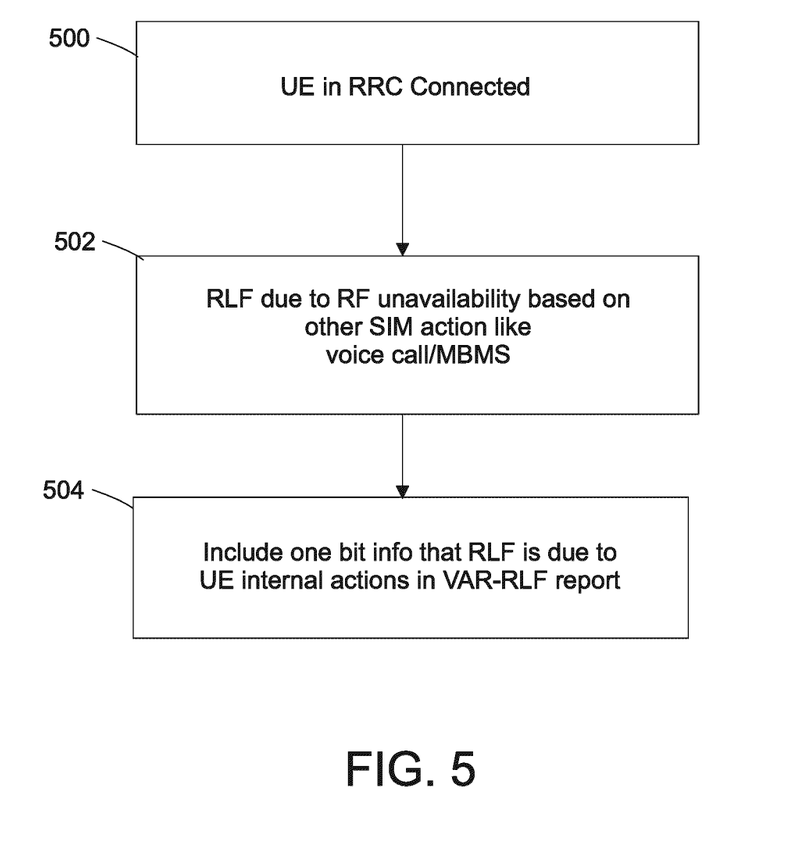
FIG. 5 shows a flow chart for providing self-optimisation data according to another embodiment.

FIG. 5 shows an example of the operation of the UE according to an embodiment, where a first SIM of the UE experiences a radio link failure (RLF) due to a voice call/MBMS taking place on the second SIM of the UE. In the beginning, the first SIM of the UE may be (500) in the RRC connected mode. Upon noticing the unavailability of the RF function of the UE caused by the voice call/MBMS taking place on the second SIM, the first SIM experiences the RLF (502). As a result, there is included (504) one bit, e.g. in or along the VAR-RLF type of MDT report, indicating that the RLF of the first SIM relates to an internal operation of the apparatus.

According to an embodiment, the operation may be defined e.g. in the RRC specification 38.331, as well as in 36.331, section 5.6.5.3, as follows (the underlined passage):
1> if rlf-ReportReq is set to true and the UE has radio link failure information or handover failure information available in VarRLF-Report and if the RPLMN is included in plmn-IdentityList stored in VarRLF-Report:
2> set timeSinceFailure in VarRLF-Report to the time that elapsed since the last radio link or handover failure in E-UTRA;
2>3> If the RLF has occurred due to UE internal actions not related to the present network like RF reservation for other SIM, set the field rlfduetoueinternalactions
2> set the rlf-Report in the UEInformationResponse message to the value of rlf-Report in VarRLF-Report;
2> discard the rlf-Report from VarRLF-Report upon successful delivery of the UEInformationResponse message confirmed by lower layers;

Alternatively, the UE may be refrained from sending VAR-RLF report, if the RLF of the first SIM relates to an internal operation of the apparatus. However, this may not be a preferable option, since the network side already has knowledge that an RLF has happened. Thereupon, not sending a report for the detected RLF due to an internal action of the UE may confuse the network since it remains unaware of the actual reason for the RLF.

Figure 6:
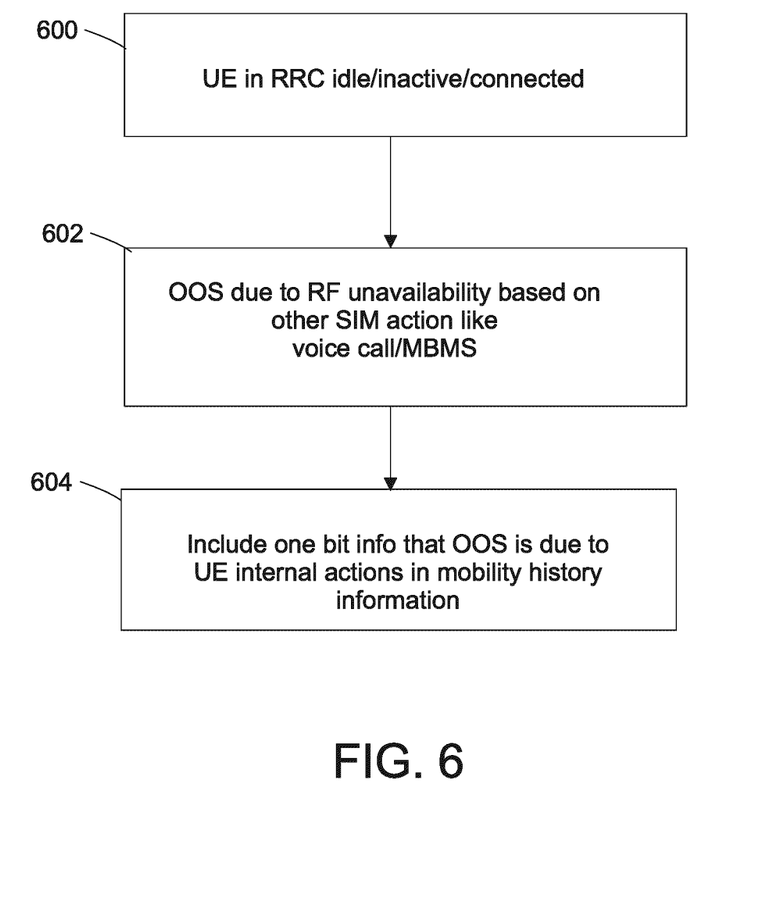
FIG. 6 shows a flow chart for providing self-optimisation data according to yet another embodiment.

FIG. 6 shows an example of the operation of the UE according to an embodiment, where a first SIM of the UE moves to out-of-service (OOS) state due to a voice call/MBMS taking place on the second SIM of the UE. In the beginning, the first SIM of the UE may be (600) in any of the RRC modes (idle/inactive/connected). Upon detecting the unavailability of the RF function of the UE due to the voice call/MBMS taking place on the second SIM, the first SIM moves into out-of-service (OOS) state (602). As a result, there is included (604) one bit, e.g. in or along the mobility history information MDT report, indicating that the OOS state of the first SIM relates to an internal operation of the apparatus.

According to an embodiment, the operation may be defined e.g. in the RRC specification 38.331, as well as in 36.331 Release 14, section 5.6.11.2, as follows (the underlined passage):

1> upon entering E-UTRA (in RRC_CONNECTED or RRC_IDLE) while previously out of service and/or using another RAT:
2> include an entry in variable VarMobilityHistoryReport possibly after removing the oldest entry, if necessary, according to following:
3> set the field timeSpent of the entry as the time spent outside E-UTRA;
3> If the OOS has occurred due to UE internal actions not related to the present network like RF reservation for other SIM, set the field OOSduetoueinternalactions.

Figure 7:
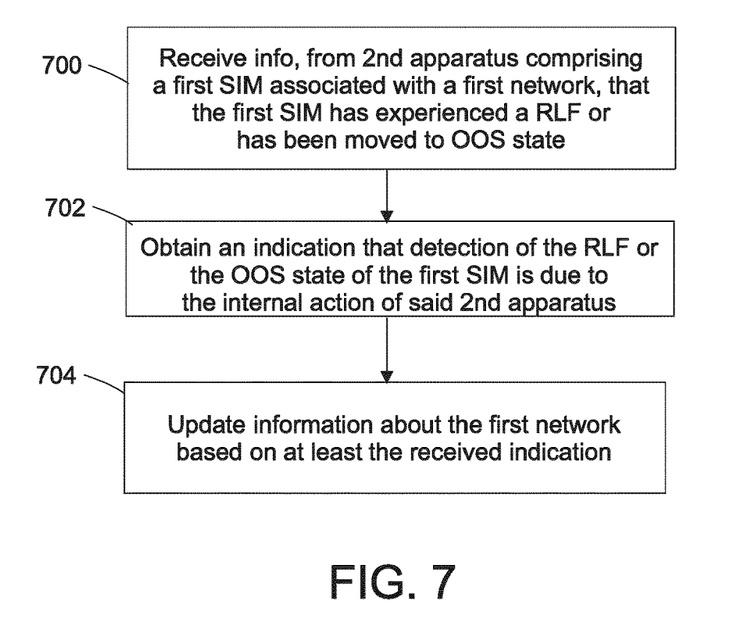
FIG. 7 shows a flow chart for obtaining self-optimisation data according to an embodiment.

Another aspect relates to an operation of a network element, such as a gNB, for receiving and processing the SON data provided by the UE. The method, which is disclosed in FIG. 7, comprises receiving (700) information, from an apparatus comprising at least a first subscriber identity module (SIM) associated with a first network, that the first SIM has experienced a radio link failure (RLF) or has been moved to out-of-service (OOS) state; obtaining (702) from said information an indication that detection of the RLF or the OOS state of the first SIM is due to the internal action of said apparatus; and updating (704) information about the first network based on at least the received indication.

Thus, the network element, such as a eNB/gNB, receives besides the SON data as defined by the standards, but also an indication that the detection of the RLF or the OOS state of the SIM is due to the internal action of said apparatus. Such data may be obtained from both DSDS devices and single SIM devices. The network element updates the SON data for further processing and analysing. The updated SON data may be stored in the network element and/or it may be forwarded to a centralized system, such as the MDT Data Collector, for further processing.

Thereupon, said indication about an occurrence of the RLF or the OOS state of the SIM being due to an internal action of the apparatus may cause the network element or the MDT Data collector to neglect, or at least selectively take into account, the SON data. As a result, decisions and actions to be taken for optimising various network parameters, such as mobility thresholds, offsets and filter coefficients, may be performed based on more reliable data about performance of the network.

Figure 8:
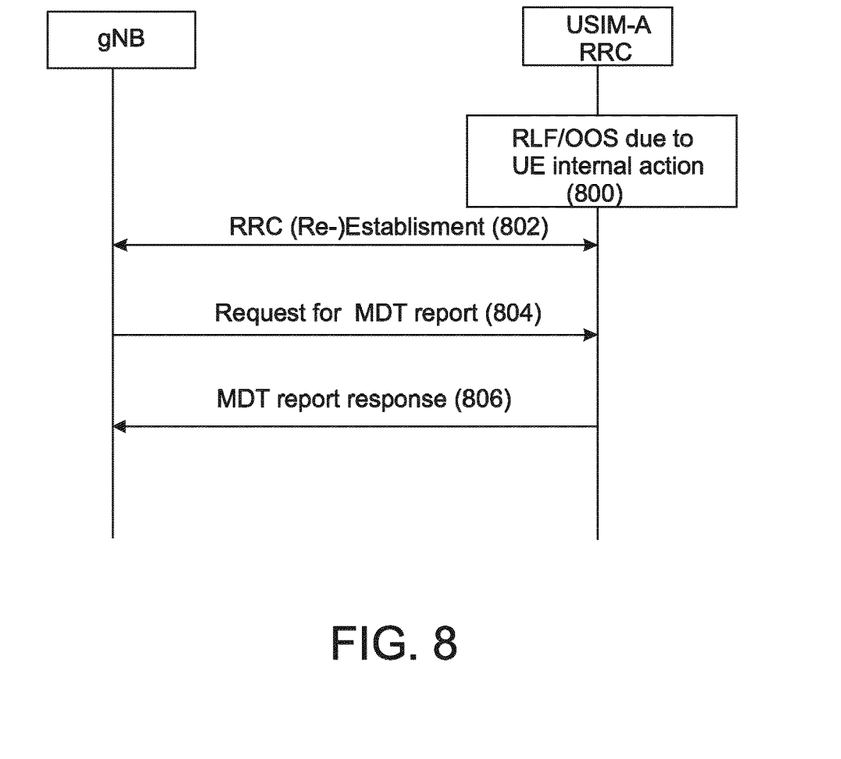
FIG. 8 shows an exemplifying signaling diagram for communication between a user equipment and a network element according to various embodiments.

FIG. 8 shows an exemplifying signalling diagram for communication between a user equipment and a network element according to various embodiments. As a starting point, the UE, or more precisely the network subscription associated with a SIM of the UE operating in one of the RRC modes, either experiences (800) a radio link failure (RLF) or moves to out-of-service (OOS) state due to an internal action of said UE. Thereafter, the network element, such as the gNB, and the UE initiate (802) a RRC establishment procedure (if the UE was in idle mode before RLF/OOS) or a RRC Re-establishment procedure (if the UE was in connected mode before RLF) for establishing an RRC connection. The network element may send (804) a request for one or more MDT reports, such as an RLF report or a mobility history information, to the UE. The UE acknowledges the request by sending (806) the requested one or more MDT reports, wherein said report is provided with an indication that detection of the RLF or the OOS state of the SIM is due to the internal action of said apparatus.

Figure 9:
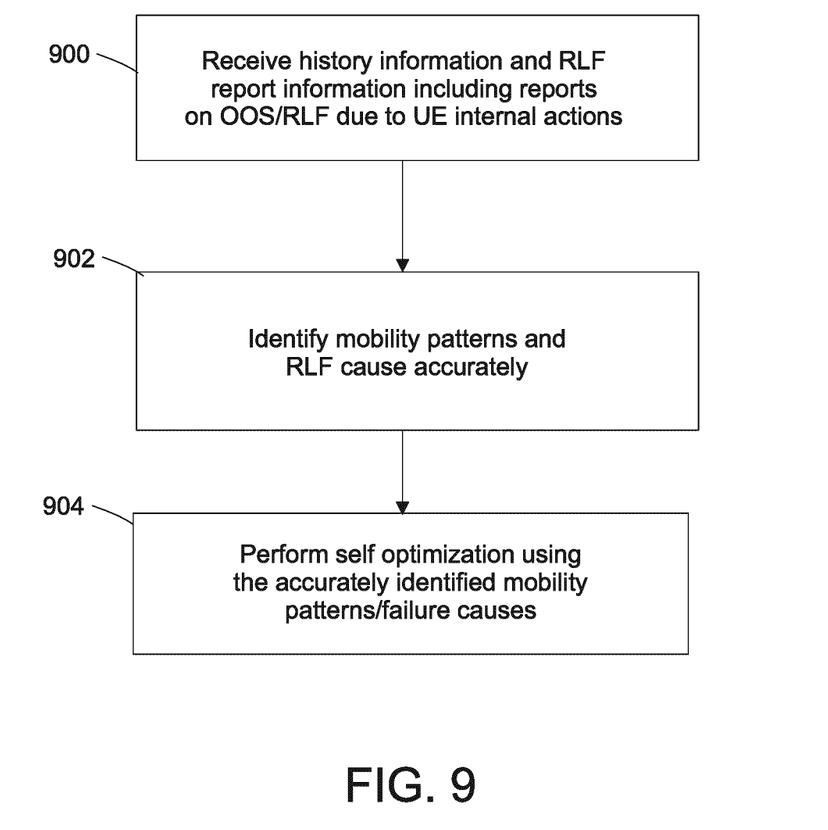
FIG. 9 shows a flow chart for obtaining self-optimisation data according to another embodiment.

FIG. 9 shows an example of the operation of a network element, such as a gNB, according to an embodiment, wherein the network element receives one or more MDT reports from at least one UE. The network element, such as a gNB, receives (900) e.g. a mobility history information MDT report and/or a VAR-RLF type of MDT report including an indication that the detected OOS or RLF is caused by an internal action of the UE. The network element, such as the gNB, may use this information for more accurately identifying (902) the mobility patterns and/or causes underlying the RLF. The network element, such as the gNB, may forward this information to a centralized MDT system (MDT Data Collector), but it may also independently perform (904) the optimisation of at least some parameters, such as mobility thresholds/offsets/filter coefficients etc.

An apparatus according to an aspect of the invention is arranged to implement the first method as described above, and possibly one or more of the embodiments related thereto. Thus, the apparatus, such as the apparatus depicted in FIG. 1, comprises at least a first subscriber identity module (SIM) associated with a first network; means for detecting that the first SIM experiences a radio link failure (RLF) or has moved to out-of-service (OOS) state due to an internal action of said apparatus; means for including in a report to be sent to the first network information about the detection of the RLF or the OOS state of the first SIM; and means for including in the report an indication that the detection of the RLF or the OOS state of the first SIM is due to the internal action of said apparatus.

An apparatus according to a further aspect comprises at least a first subscriber identity module (SIM) associated with a first network, at least one processor and at least one memory, said at least one memory stored with computer program code thereon, the at least one memory and the computer program code configured to, with the at least one processor, cause the apparatus at least to perform: detect that the first SIM experiences a radio link failure (RLF) or has moved to out-of-service (OOS) state due to an internal action of said apparatus; include in a report to be sent to the first network information about the detection of the RLF or the OOS state of the first SIM; and include in the report an indication that the detection of the RLF or the OOS state of the first SIM is due to the internal action of said apparatus.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended examples. However, all such and similar modifications of the teachings of this invention will still fall within the scope of this invention.

The invention claimed is:

1. An apparatus comprising: at least a first subscriber identity module (SIM) associated with a first network; a second SIM associated with a second network; at least one processor; and at least one memory including computer program code; the at least one memory and the computer program code configured to, with the at least one processor, cause the apparatus at least to: detect that the first SIM experiences a radio link failure (RLF) or has moved to out-of-service (OOS) state due to an internal action of said apparatus; include in a report to be sent to the first network information about the detection of the RLF or the OOS state of the first SIM, wherein said report is a minimization of test drive (MDT) report; and include in the report an indication that the detection of the RLF or the OOS state of the first SIM is due to the internal action of said apparatus, wherein said internal action of the apparatus is at least a shutdown of a radio transceiver of the apparatus, wherein the apparatus shuts down an RF circuit due to high operating temperature or as a part of power saving mechanism when the battery level is low, wherein said indication is a flag indicating whether the detection of the RLF or the OOS state of the first SIM relates to the first network, wherein the flag is one bit, in or along the MDT report, and the bit is allocated a value 1, when the detection of the RLF or the OOS state of the first SIM relates to the first network, and a value 0, when the detection of the RLF or the OOS state of the first SIM relates to an internal operation of the apparatus.

2. The apparatus according to claim 1, wherein said internal action of the apparatus further comprises a reservation of a radio transceiver of the apparatus for a communication of the second SIM with the second network, wherein the radio transceiver of the apparatus is reserved for only either of the SIMs for originating or terminating a communication, whereupon the other SIM is not active and either experiences RLF, if it was in connected mode, or a move to OOS state, if it was in idle mode.

3. A method comprising: detecting, in an apparatus comprising at least a first subscriber identity module (SIM) associated with a first network and a second SIM associated with a second network, that the first SIM experiences a radio link failure (RLF) or has moved to out-of-service (OOS) state due to an internal action of said apparatus; including in a report to be sent to the first network information about the detection of the RLF or the OOS state of the first SIM, wherein said report is a minimization of test drive (MDT) report; and including in the report an indication that the detection of the RLF or the OOS state of the first SIM is due to the internal action of said apparatus, wherein said internal action of the apparatus is at least a shutdown of a radio transceiver of the apparatus, wherein the apparatus shuts down an RF circuit due to high operating temperature or as a part of power saving mechanism when the battery level is low, wherein said indication is a flag indicating whether the detection of the RLF or the OOS state of the first SIM relates to the first network, wherein the flag is one bit, in or along the MDT report, and the bit is allocated a value 1, when the detection of the RLF or the OOS state of the first SIM relates to the first network, and a value 0, when the detection of the RLF or the OOS state of the first SIM relates to an internal operation of the apparatus.

4. The method according to claim 3, wherein said internal action of the apparatus further comprises a reservation of a radio transceiver of the apparatus for a communication of the second SIM with the second network, wherein the radio transceiver of the apparatus is reserved for only either of the SIMs for originating or terminating a communication, whereupon the other SIM is not active and either experiences RLF, if it was in connected mode, or a move to OOS state, if it was in idle mode.

* * * * *